(12) United States Patent
Shimizu et al.

(10) Patent No.: US 7,051,687 B2
(45) Date of Patent: May 30, 2006

(54) VALVE OPERATION CONTROLLER

(75) Inventors: Yasuo Shimizu, Wako (JP); Toshihiro Yamaki, Wako (JP); Hisao Sakai, Wako (JP)

(73) Assignee: Honda Giken Kogya Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/466,721

(22) PCT Filed: Jan. 18, 2002

(86) PCT No.: PCT/JP02/00357

§ 371 (c)(1),
(2), (4) Date: Jul. 18, 2003

(87) PCT Pub. No.: WO02/057609

PCT Pub. Date: Jul. 25, 2002

(65) Prior Publication Data

US 2004/0069054 A1    Apr. 15, 2004

(30) Foreign Application Priority Data

Jan. 19, 2001    (JP) .............................. 2001-012300

(51) Int. Cl.
*F01L 9/04*    (2006.01)

(52) U.S. Cl. ................. 123/90.11; 123/90.15; 251/129.01; 251/129.15; 251/129.16

(58) Field of Classification Search ............. 123/90.11, 123/90.27, 90.15–90.18; 251/129.01, 129.1, 251/129.15, 129.16; 335/205, 207, 128, 335/78

See application file for complete search history.

(56) References Cited

U.S. PATENT DOCUMENTS

| | | | |
|---|---|---|---|
| 4,759,321 A | 7/1988 | Matsumoto et al. ..... | 123/90.15 |
| 5,183,011 A | 2/1993 | Fujii et al. | |
| 5,220,899 A * | 6/1993 | Ikebe et al. .................. | 123/531 |
| 5,331,931 A * | 7/1994 | Blish et al. .............. | 123/90.11 |
| 5,598,814 A * | 2/1997 | Schroeder et al. ........ | 123/90.11 |
| 5,647,312 A | 7/1997 | Salber et al. | |
| 5,950,582 A * | 9/1999 | Stein ........................ | 123/90.15 |
| 5,957,096 A * | 9/1999 | Clarke et al. ............ | 123/90.15 |

(Continued)

FOREIGN PATENT DOCUMENTS

JP    64528/1982    11/1983

(Continued)

*Primary Examiner*—Thomas Denion
*Assistant Examiner*—Zelalem Eshete
(74) *Attorney, Agent, or Firm*—Lahive & Cockfield, LLP; Anthony A. Laurentano, Esq.

(57) ABSTRACT

A valve operation controller for an internal combustion engine is provided for optimally setting a valve opening timing and a valve closing timing for an intake valve in accordance with an operating state of the internal combustion engine to improve the fuel efficiency and power of the internal combustion engine, eliminate fuel stagnation in the intake valve and sticking of the intake valve with its valve seat, and reduce the cost and weight. The valve operation controller controls open/close operations of exhaust valves (EV1, EV2) and first and second intake valves (IV1, IV2) arranged in one cylinder (4). An electromagnetic valve operating mechanism (5) electromagnetically opens/closes the first intake valve (IV1). A cam type valve operating mechanism (6) opens/closes the second intake valve (IV2) with an intake cam (11) arranged on a cam shaft (10) driven in synchronism with rotation of the internal combustion engine (3). The cam type valve operating mechanism (6) can generate a cylinder flowage within a combustion chamber of the cylinder (4). An ECU (2) controls operations of the electromagnetic valve operating mechanism (5) and the cam type valve operating mechanism (6).

12 Claims, 8 Drawing Sheets

U.S. PATENT DOCUMENTS

| | | | |
|---|---|---|---|
| 6,009,841 A | * 1/2000 | Hickey | 123/90.15 |
| 6,148,779 A | 11/2000 | Hickey | |

FOREIGN PATENT DOCUMENTS

| | | |
|---|---|---|
| JP | 61-294109 | 12/1986 |
| JP | 3-189312 | 8/1991 |
| JP | 7-305613 A | 11/1995 |
| JP | 4-292509 | 10/1996 |
| JP | 11-117776 | 4/1999 |
| JP | 11-287139 | 10/1999 |

* cited by examiner

VALVE OPERATION CONTROLLER

TECHNICAL FIELD

The present invention relates to a valve operation controller for an internal combustion engine which has an exhaust valve and a plurality of intake valves arranged in one cylinder.

BACKGROUND ART

A variety of valve operation controllers have been conventionally proposed for variably controlling opening/closing timings and lift amounts of an intake valve and an exhaust valve in order to appropriately tuning the intake/exhaust performance in accordance with an operating state of an internal combustion engine. As one of such conventional valve operation controllers, there has been known a type of controller which changes the phase of an intake cam (hereinafter called the "cam phase") for a cam shaft (see, for example, Laid-open Japanese Patent Application No. 7-301144). This type of valve operation controller continuously changes the valve phase to continuously control opening/closing timings of an intake valve. For example, when an engine is heavily loaded, the valve operation controller continuously changes the opening/closing timings of the intake valve in accordance with the rotational speed of the engine to maximally utilize the inertia effect of intake air to enhance a filling efficiency, thereby increasing the power. On the other hand, when the engine is lightly loaded, the valve operation controller advances the opening/closing timings of the intake valve to extend a valve overlap with an exhaust valve (a period in which both valves are open) to increase the amount of internal EGR, thereby decreasing the combustion temperature to reduce the amount of emitted NOx.

As another type of conventional valve operation controller, there has been known a valve operation controller which has a lower speed cam and a higher speed cam having predetermined cam profiles different from each other for each of an intake cam and an exhaust cam for switching the cam profile of each cam between the lower speed cam and higher speed cam (see for example Laid-open Japanese Patent Application No. 62-12811). This valve operation controller switches the intake and exhaust cams to the lower speed cams during low rotational speed and to the higher speed cams during high rotational speed to provide optimal opening/closing timings and lift amounts for the intake and exhaust valves in each of the rotational speed ranges to ensure a high intake/exhaust efficiency, thereby realizing high engine performance. Another known valve operation controller of this type sets a cam profile of one of intake cams to open/close an intake valve by a minute lift amount to generate a swirl so that a stable combustion state is ensured even with a lean air/fuel mixture, thereby improving the fuel efficiency and eliminating fuel stagnation in the intake valve (see, for example, Laid-open Japanese Patent Application No. 7-97971).

A further known valve operation controller of another type employs electromagnets to open/close an intake valve and an exhaust valve (see for example Laid-open Japanese Patent Application No. 8-200025). This valve operation controller comprises main and auxiliary intake valves and main and auxiliary exhaust valves in each cylinder, and electromagnetic valve operating mechanisms each for driving associated one of these four intake and exhaust valves. Each electromagnetic valve operating mechanism comprises two electromagnets opposing to each other; an armature arranged between the two electromagnets and coupled to an intake and exhaust valves corresponding thereto; two coil springs for urging the armature; and the like. This electromagnetic valve operating mechanism controls the conduction of both electromagnets to alternately attract the armature to the respective electromagnets to open/close the intake and exhaust valves. Therefore, the valve opening timing and valve closing timing can be arbitrarily controlled for the intake and exhaust valves by controlling the conduction timing. When both electromagnets are not conductive, the armature is held at a neutral position between both electromagnets by a balance of urging forces of both coil springs, thereby holding the intake and exhaust valves in an open state.

Also, in this valve operation controller, the main intake valve and auxiliary intake vale are driven in a different combination in accordance with a particular operating state of the internal combustion engine. Specifically, the main intake valve is paused and the auxiliary intake valve only is operated in a low-speed low-load state; the auxiliary intake vale is paused and the main intake valve is operated in a middle-rotation middle-load state to supply an amount of intake air suitable for the operating state, while generating a swirl, to ensure a stable combustion state; and both main and auxiliary intake valves are operated in a high-rotation high-load state to ensure high power.

However, among the conventional valve operation controllers described above, the first type one which varies the cam phase simply changes the phase of the intake cam with respect to the cam shaft. Since a valve opening period is fixed for the intake valve, the valve closing timing is automatically determined as a valve opening timing is set for the intake valve. For this reason, the valve operation controller cannot simultaneously provide an optimal valve opening timing and an optimal valve closing timing in the overall rotational speed region and load region. For example, while it is preferred that valve opening and closing timings are set to minimize the fuel efficiency at a combustion fluctuation limit during a low speed operation and to maximize a torque during a middle to high speed operation, this valve operation controller encounters difficulties in realizing such valve operations.

The second type of valve operation controller which switches cam profiles only has two stages of cam profiles to switch, so that the opening/closing timings and lift amounts provided thereby for the intake and exhaust valves merely change in two stages. Therefore, the valve operation controller fails to provide optimal opening/closing timings and lift amounts in the overall rotational speed region and load region.

On the other hand, the third type of conventional valve operation controller having the electromagnetic valve operating mechanisms is capable of arbitrarily controlling valve opening timings and valve closing timings for the intake and exhaust valves, so that this valve operation controller can advantageously provide optimal opening/closing timings in the overall rotational speed region and load region. However, since this valve operation controller drives all the intake and exhaust valves using the electromagnetic valve operating mechanisms, the power consumption is increased, causing a resulting reduction in the fuel efficiency. Also, since the electromagnets, armature and the like, forming part of the electromagnetic valve operating mechanisms, are made of magnetic materials, the valve operation controller is disadvantageous in a larger weight and an increased manufacturing cost.

Also, since this valve operation controller relies on the attraction of the armature by the two electromagnets to open/close the intake valve, the lift amount for the intake valve is fixed, so that difficulties would be encountered in opening/closing the intake valve by a minute lift amount. Therefore, when the main intake valve or auxiliary intake valve is paused, it must be held in a fully closed state. Depending on a particular operating condition of the internal combustion engine, if this main or auxiliary intake valve is continuously held in the fully closed state, carbons generated by combustion may stick to the paused intake valve and a valve seat thereof, in which case the intake valve is forcedly torn off from the valve seat when the intake valve resumes the operation, thereby possibly damaging the sealability with the valve seat. Also, since the paused intake valve in the fully closed state results in fuel stagnation, an air/fuel mixture is enriched to degrade the exhaust gas characteristic when the intake valve resumes the operation.

Further, in this valve operation controller, when the armature is applied with a mechanical impact or some vibrations when the armature is being attracted by an electromagnet or is moving between the electromagnets, the valve operation controller can suffer from a phenomenon in which the intake and exhaust valves are returned to their neutral positions by urging forces of the coil springs (hereinafter called the "step-out phenomenon"). Particularly when the step-out phenomenon appears on the exhaust valve side, an unburnt gas is exhausted to the outside through the stepped-out exhaust valve during a compression stroke and an explosion stroke, thereby possibly resulting in degraded exhaust gas characteristic.

DISCLOSURE OF THE INVENTION

The present invention has been made to solve the problems mentioned above, and it is an object of the invention to provide a valve operation controller for an internal combustion engine which is capable of optimally setting a valve opening timing and a valve closing timing for an intake valve in accordance with an operating state of the engine to improve the fuel efficiency and power, eliminate fuel stagnation in the intake valve and sticking of the same to its valve seat, and reduce the cost and weight thereof.

To achieve the above object, the present invention provides a valve operation controller for an internal combustion engine for controlling open/close operations of an exhaust valve and a first and a second intake valve arranged in one cylinder. The valve operation controller comprises an electromagnetic valve operating mechanism for electromagnetically opening/closing the first intake valve; a cam type valve operating mechanism for opening/closing the second intake valve with an intake cam arranged on a cam shaft driven in synchronism with rotation of the internal combustion engine, the cam type valve operating mechanism capable of generating a cylinder flowage within a combustion chamber of the cylinder; and control means for controlling operations of the electromagnetic valve operating mechanism and the cam type valve operating mechanism.

In this valve operation controller for an internal combustion engine, the first intake valve of the first and second intake valves arranged in one cylinder is electromagnetically opened/closed by the electromagnetic valve operating mechanism, the operation of which is controlled by the control means. As such, since the first intake valve can be arbitrarily controlled for the valve opening timing and valve closing timing, appropriate opening/closing timings can be achieved in every and each operating state of the internal combustion engine. The second intake valve, on the other hand, is opened/closed by the cam type valve operating mechanism following the intake cam of the cam shaft which is driven in synchronism with the rotation of the internal combustion engine. The cam type valve operating mechanism is configured to generate a cylinder flowage represented by a swirl in the combustion chamber of the cylinder, and its operation is controlled by the control means.

Thus, the appropriate fuel efficiency and power can be provided in accordance an operating state by combining as appropriate the settings of the opening/closing timings for the first intake valve and the generation and stoppage of the cylinder flowage by the second intake valve in accordance with a particular operating state. For example, in a low rotational speed/low load operating state, a cylinder flowage is generated by the second intake valve to ensure a stable combustion state even with a lean air/fuel mixture, and the opening/closing timings for the first intake valve are set near the combustion fluctuation limit, thereby making it possible to achieve an optimal fuel efficiency. In a high rotational speed/high load operating state, in turn, the cylinder flowage generated by the second intake valve is stopped to increase the amount of intake air, and the opening/closing timings for the first intake valve IV2 are set near the power limit, thereby making it possible to produce maximally large power.

Also, since the second intake valve is driven by the cam type valve operating mechanism rather than the electromagnetic valve operating mechanism, the cost and weight can be reduced, as compared with the conventional valve operation controller which drives both intake valves by a electromagnetic valve operating mechanism.

Preferably, in the valve operation controller for an internal combustion engine, the cam type valve operating mechanism comprises a cam profile switching mechanism for switching a cam profile of the intake cam between a minute lift cam for opening/closing the second intake valve by a minute lift amount to generate the cylinder flowage, and a normal lift cam for opening/closing the second intake valve by a lift amount larger than the minute lift amount.

According to the configuration described above, the cam type valve operating mechanism for opening/closing the second intake valve has the cam profile switching mechanism. When the cam profile is switched to the minute lift cam, the second intake valve is opened/closed by a minute lift amount to generate a cylinder flowage. In this manner, the second intake valve is opened/closed by the minute lift amount while the cylinder flowage is being generated, so that fuel stagnation can be eliminated in the second intake valve, and the air/fuel mixture can be prevented from being enriched immediately after the cylinder flowage is stopped. In addition, carbons produced by the combustion will not stick to the second intake valve and the valve seat thereof, even if the cylinder flowage is generated for a long time, thereby making it possible to eliminate the problem of the second intake valve stuck to the valve seat. Also, in a high rotational speed state and a high load state, for example, the cam profile is switched to the normal lift cam to increase the amount of intake air, thereby ensuring larger power.

Preferably, in the valve operation controller for an internal combustion engine, the cam type valve operating mechanism comprises a swirl control valve at a location upstream of the second intake valve.

According to the configuration described above, the swirl control valve is operated in accordance with an operating state of the internal combustion engine to generate a swirl as a cylinder flowage, and the swirl control valve is stopped to provide high power. Also, since the second intake valve itself is normally opened/closed by the cam type valve operating mechanism, the fuel stagnation and sticking to the valve seat are eliminated in the second intake valve, as is the case with the aforementioned configuration.

Preferably, the valve operation controller for an internal combustion engine further comprises operating state detecting means for detecting an operating state of the internal combustion engine; and operation mode determining means for determining an operation mode for each of the electromagnetic valve operating mechanism and the cam type valve operating mechanism in accordance with the detected operating state of the internal combustion engine.

According to the configuration described above, since the operation mode is determined for the electromagnetic valve operating mechanism in accordance with a detected operating state of the internal combustion engine, the valve opening timing and valve closing timing can be optimally set for the first intake valve in accordance with an actual operating state in all rotational speed regions and load regions. Also, since the operation mode for the cam type valve operating mechanism is determined as well in accordance with the detected operating state, the cylinder flowage can be appropriately generated by the cam type valve operating mechanism in accordance with the actual operating state.

Preferable, the valve operation controller for an internal combustion engine further comprises a cam type exhaust valve operating means for opening/closing the exhaust valve with an exhaust cam arranged on the cam shaft driven in synchronism with rotation of the internal combustion engine.

According to the configuration described above, since the exhaust valve is driven by the cam type exhaust valve operating mechanism in a manner similar to the second intake valve, rather than an electromagnetic valve operating mechanism, the cost and weight can be reduced correspondingly. Also, unlike the prior art, the exhaust valve will be free from the step-out phenomenon inherent to an electromagnetic valve operating mechanism, thus eliminating a possible degradation of the exhaust gas characteristic due to the emission of unburnt gas through a stepped-out exhaust valve.

BEST MODE FOR CARRYING OUT THE INVENTION

Figure 1:
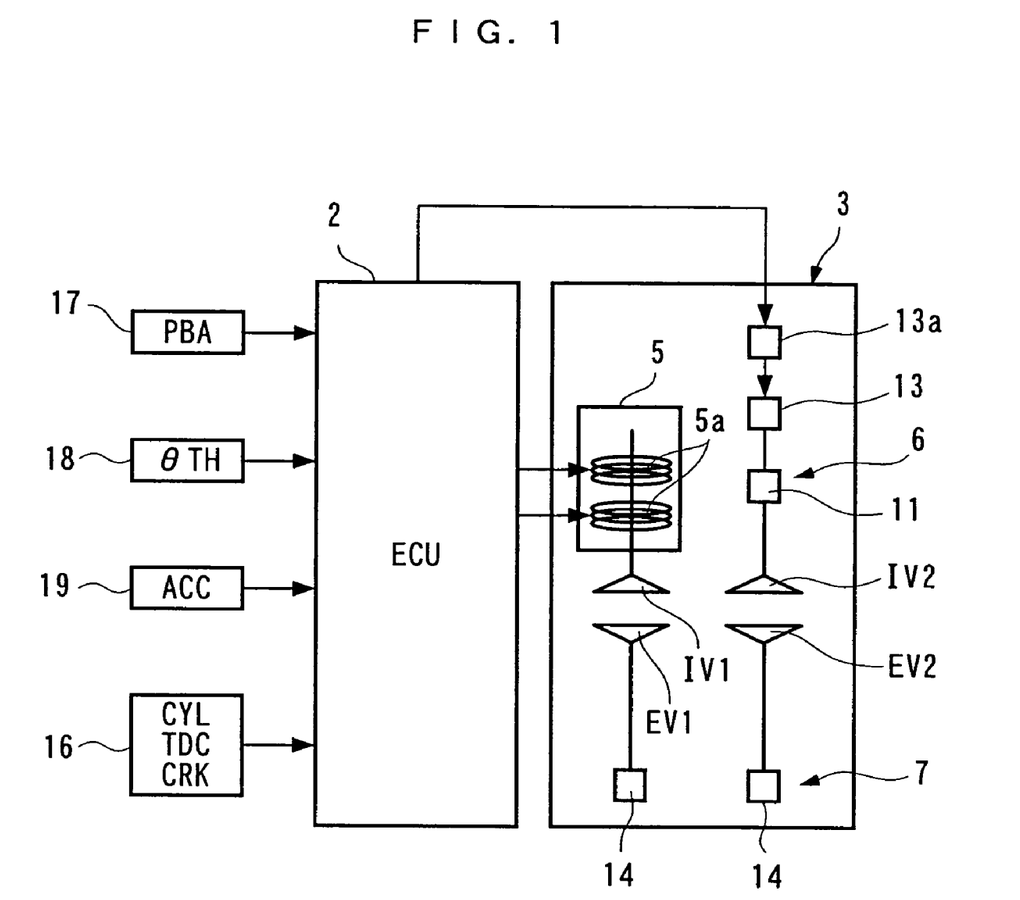
FIG. 1 is a block diagram generally illustrating the configuration of a valve operation controller for an internal combustion engine according to a first embodiment of the present invention.
Figure 2:
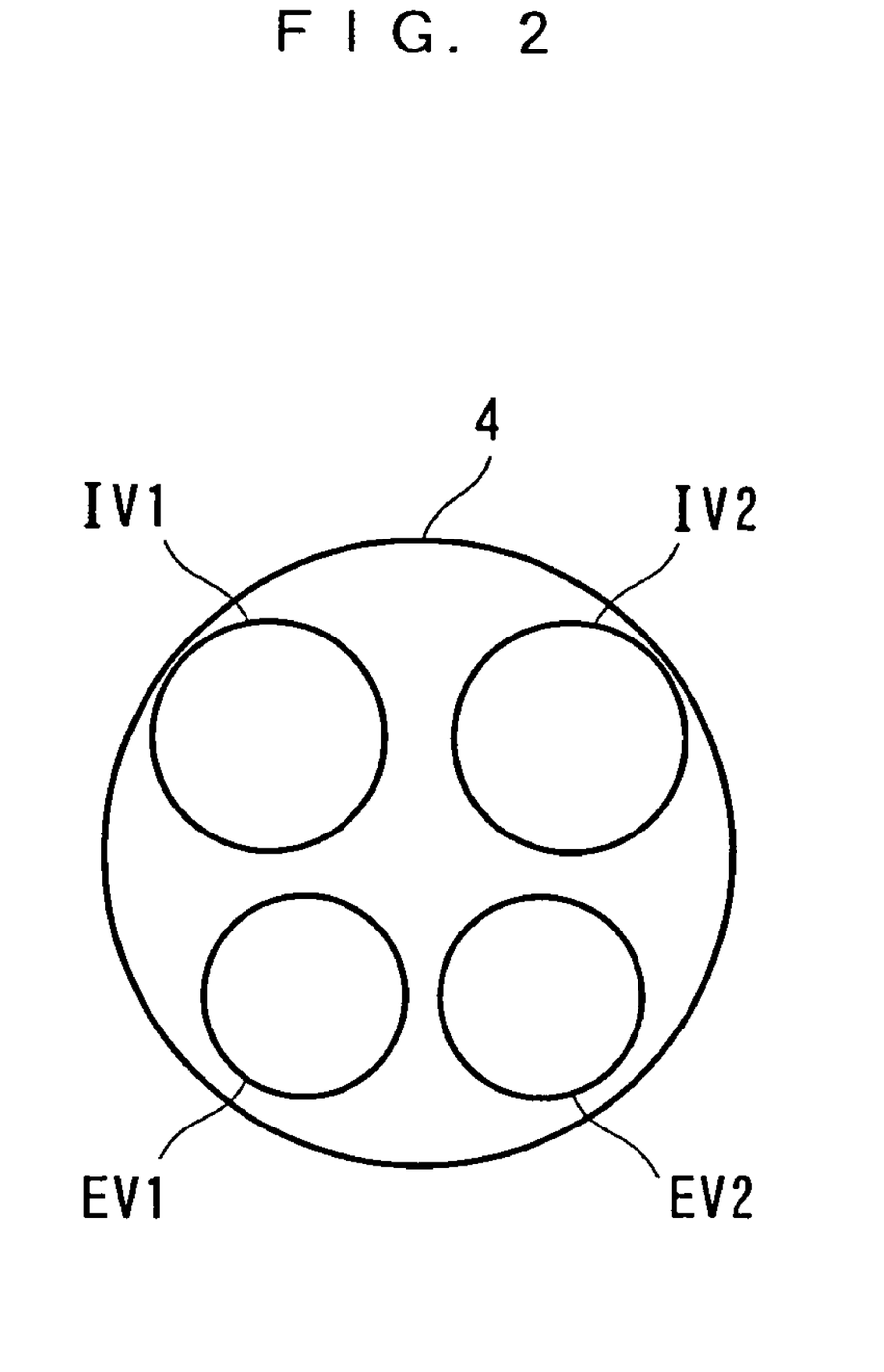
FIG. 2 is a diagram showing the positions of intake valves and exhaust valves.
Figure 3:
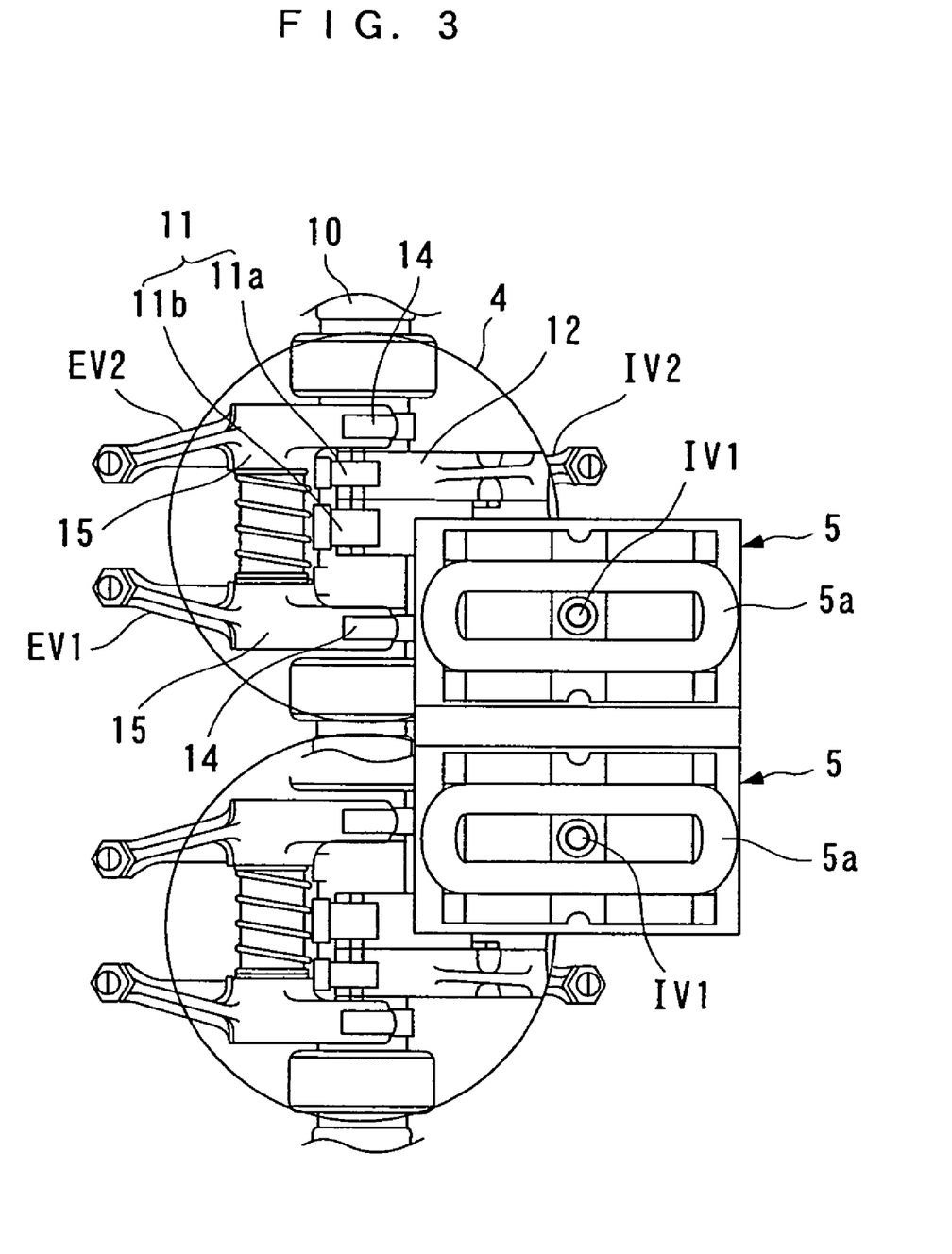
FIG. 3 is a plan view illustrating the structure and arrangement of intake valves, exhaust valves and the valve operation controller for two cylinders.

In the following, a valve operation controller, a valve operation control method and an engine control unit for an internal combustion engine according to a first embodiment of the present invention will be described with reference to the accompanying drawings. FIG. 1 generally illustrates the valve operation controller according to the first embodiment. An illustrated internal combustion engine (hereinafter simply called the "engine") 3 is a straight four-cylinder (two cylinders are illustrated in FIG. 3) SOHC type gasoline engine equipped in a vehicle, not shown. As shown in FIG. 2, each cylinder 4 is provided with a first and a second intake valve IV1, IV2, and a first and a second exhaust valve EV1, EV2. In this embodiment, the first intake valve IV1 is driven by an electromagnetic valve operating mechanism 5 to open and close; the second intake valve IV2 by a cam type valve operating mechanism 6; and both exhaust valves EV1, EV2 by a cam type exhaust valve operating mechanism 7, respectively. Intake valve ports (not shown) opened/closed by the intake valves IV1, IV2, and exhaust valve ports (not shown) opened/closed by the exhaust valves EV1, EV2 are in communication with a single intake port 8 and exhaust port 9 (see FIG. 4), so that a fuel is injected into the intake port 5 from a fuel injection valve (not shown).

The electromagnetic valve operating mechanism 5 comprises two upper and lower electromagnets 5a; an armature (not shown) arranged between both electromagnets 5a and coupled to the first intake valve IV1; two coil springs (not shown) for urging the armature; and so on. The electromagnets 5a are controlled to enter an excited or a non-excited state by a driving signal from an ECU 2, later described, to alternately attract the armature to open/close the first intake valve IV1. Therefore, by controlling the output timing of the driving signal, a valve opening timing and a valve closing timing can be arbitrarily controlled for the first intake valve IV1. The first intake valve IV1 is provided with a displacement sensor (not shown) for detecting the position of a valve body thereof. The displacement sensor generates a detection signal outputted to the ECU 2.

As illustrated in FIG. 3, in two cylinders 4 on both sides out of the four straight cylinders 4, the first intake valves IV1 are arranged adjacent to each other, and the electromagnetic valve operating mechanisms 5 for driving these adjacent first intake valves IV1 are formed as a single module. With such a modular configuration, only two electromagnetic valve operating mechanisms need be mounted for the four cylinders 4, so that the mounting and assembly are facilitated.

The cam type valve operating mechanism 6 for driving the second intake valve IV2 comprises a cam shaft 10; an intake cam 11 integrally arranged on the cam shaft 10; a pivotable rocker arm 12 driven by the intake cam 11 for converting a rotational motion of the cam shaft 10 to a reciprocal motion of the first intake valve IV1; a cam profile switching mechanism (hereinafter abbreviated as "VTEC") 13 for switching cam profiles for the intake cam 11; and the like. The cam shaft 10 is coupled to a crank shaft (not shown) of the engine 3 through a driven sprocket and a timing chain (none of which is shown), such that the cam shaft 10 is driven by the crank shaft to rotate once per two turns of the crank shaft.

Figure 4:
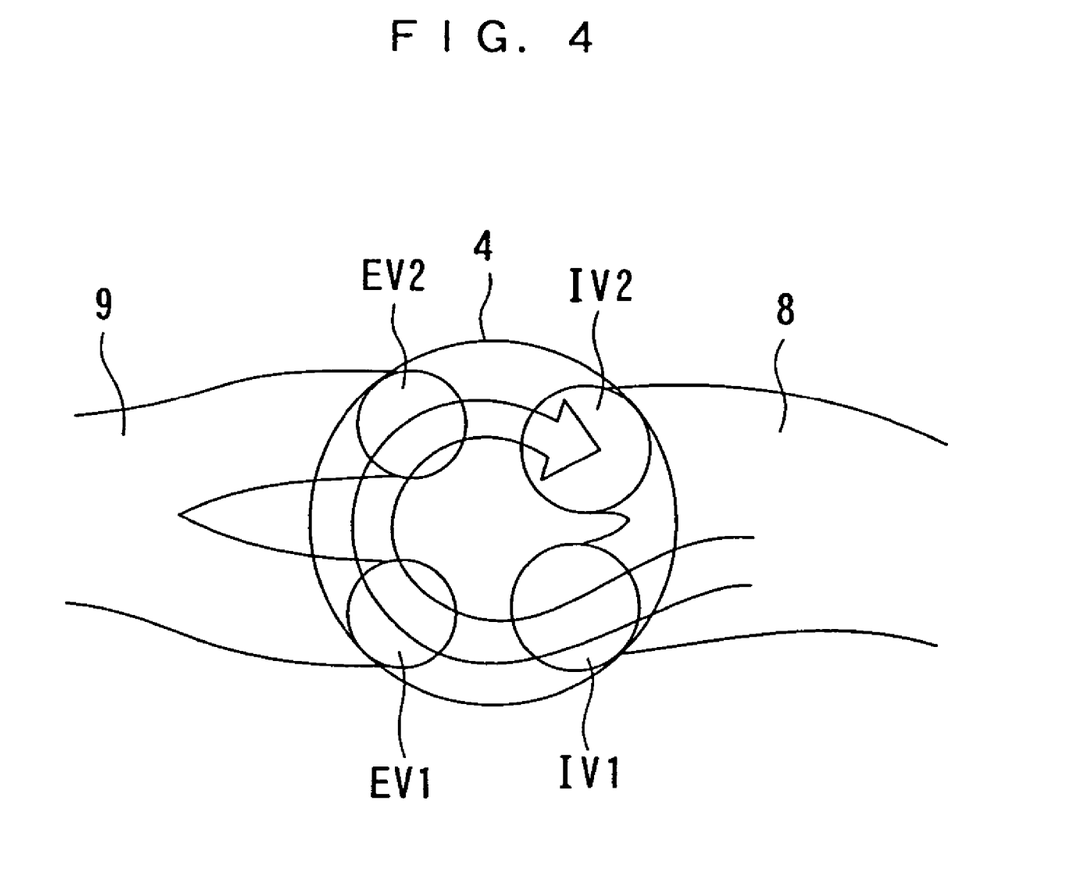
FIG. 4 is a diagram showing how a swirl is generated in a pause mode of a first intake valve.

As illustrated in FIG. 3, the intake cam 11 is comprised of a minute lift cam 11a having a very low cam nose, and a low-speed cam 11b (normal lift cam) having a cam profile higher than the lift cam 11a. These minute lift cam 11a and low-speed cam 11b are switched by the VTEC 13, causing an operation mode of the second intake valve IV2 to be switched between a pause mode and an active mode. In the pause mode, the second intake valve IV2 is opened/closed by a minute lift amount in accordance with the cam profile of the minute lift cam 11a, thereby generating a swirl flowing in the horizontal direction from the first intake valve IV1 to the second intake valve IV2 within the cylinder 4, as a cylinder flowage, as illustrated in FIG. 4. In the active mode, on the other hand, the second intake vale IV2 is opened/closed by a larger lift amount and at opening/closing timings in accordance with the cam profile of the low-speed cam 11b, thereby providing larger power. The operation of the VTEC 13 is controlled by controlling a VTEC electromagnetic control valve 13a by a driving signal from the ECU 2 to change an oil pressure applied to the VTEC 13.

The cam type exhaust valve operating mechanism 7 for driving the first and second exhaust valves EV1, EV2 is comprised of the cam shaft 10; exhaust cams 14 arranged integrally with the cam shaft 10; exhaust valve rocker arms 15; and the like. Both exhaust valves EV1, EV2 are opened/closed by a fixed lift amount and at opening/closing timings in accordance with the cam profile of the exhaust cam 14.

A crank angle sensor 16 (operating state detecting means) is arranged around the crank shaft. The crank angle sensor 16 generates a CYL signal, a TDC signal, and a CRK signal, all of which are pulse signals generated at respective predetermined crank angle positions, as the crank shaft is rotated, and outputs the generated signals to the ECU 2. Specifically, the CYL signal is generated at a predetermined crank angle position for a particular cylinder 4. The TDC signal is a signal which indicates that a piston (not shown) of each cylinder 4 is present at a predetermined crank angle position near the top dead center (TDC) at the start of an intake stroke, and one pulse is generated every 180° of crank angle in this embodiment in which the engine 3 is a four-cylinder type one. The CRK signal in turn is generated at a predetermined crank angle period shorter than the TDC signal (for example, every 30°). The ECU 2 determines the crank angle position for each cylinder 4 based on these CYL signal, TDC signal and CRK signal, and calculates the rotational speed NE of the engine 3 (hereinafter called the "engine rotational speed") based on the CRK signal.

The ECU 2 further receives a detection signal indicative of an intake pipe absolute pressure PBA at a location downstream of a throttle valve (not shown) in the intake pipe from an intake pipe absolute pressure sensor 17; a detection signal indicative of an opening θTH of the throttle valve (throttle valve opening) from a throttle valve opening sensor 18; and a detection signal indicative of an accelerator opening ACC, which is the amount of treading on an accelerator pedal (not shown), from an accelerator opening sensor 19 (operating state detecting means), respectively. All of these parameters indicate a load on the engine 3, and in this embodiment, these parameters are represented by the accelerator opening ACC as a parameter of the engine load, as described later.

In this embodiment, the ECU 2 acts as control means, operating state detecting means and operation mode determining means, and is based on a microcomputer which comprises a CPU, a RAM, a ROM, an input/output interface (none of which is shown), and the like. The detection signals from the sensors 16–19 are subjected to A/D conversion, waveform shaping in the input interface before they are inputted to the CPU. The CPU determines an operating state of the engine 3 in response to these input signals in accordance with a control program and the like stored in the ROM, determines an operation mode for the electromagnetic valve operating mechanism 5 and cam type valve operating mechanism 6, and executes a valve operation control routine for controlling opening/closing timings for the first intake valve IV1 and the switching of cam profiles for the intake cam 11 in accordance with the result of the determination.

Figure 5:
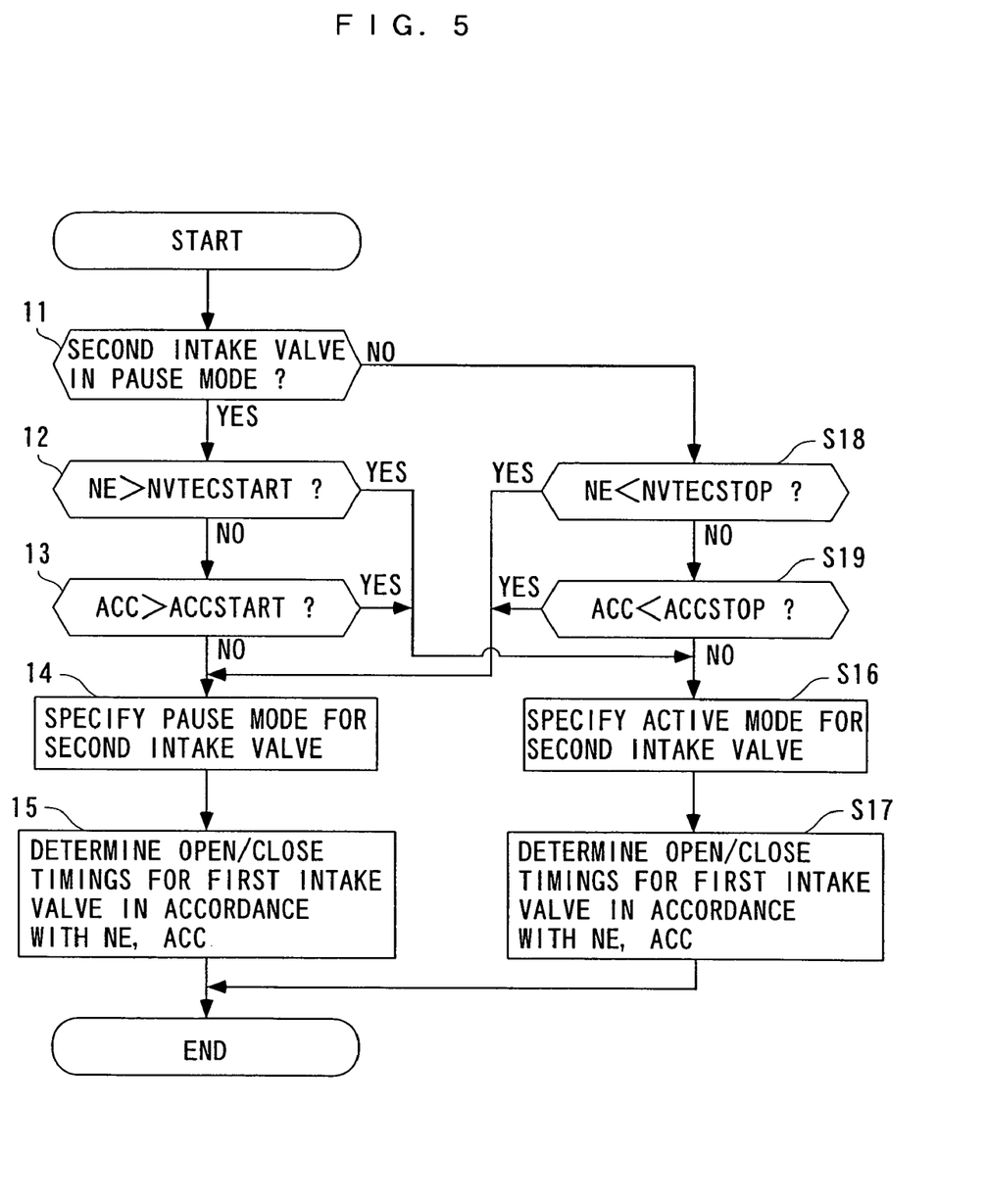
FIG. 5 is a flow chart illustrating a routine for controlling a valve operation executed by an ECU in FIG. 1.

FIG. 5 illustrates a flow chart of the valve operation control routine. In this routine, it is first determined at step 11 (indicated by "S11" in FIG. 3 and the subsequent drawings as well) whether or not the second intake valve IV2 is in a pause mode, i.e., whether or not the intake cam 11 is set to the minute lift cam 11a. If the answer to step 11 is YES, indicating that the second intake valve IV2 is in the pause mode, it is determined whether or not the engine rotational speed NE is higher than an operation start rotational speed NVTECSTART (for example, 3000 rpm) of the second intake valve IV2 (step 12). If the answer to step 12 is NO, it is determined whether or not the accelerator opening ACC is larger than an operation start opening ACCSTART (for example, 85% opening) (step 13). If the answer to step 13 is NO, i.e., if NE≦NVTECSTART and ACC≦ACCSTART are established, the pause mode is specified as the operation mode of the second intake valve IV2 (step 14), to maintain the pause mode. Next, a valve opening timing and a valve closing timing are determined for the first intake valve IV1 in the pause mode (step 15). Details on this determination will be described later.

On the other hand, if the answer to step 12 or 13 is YES, i.e., if NE>NTVECSTART or ACC>ACCSTART is established, the active mode is specified as the operation mode for the second intake valve IV2 (step 16), thereby starting the active mode, and switching the intake cam 11 to the low-speed cam 11b. Next, a valve opening timing and a valve closing timing are determined for the first intake valve IV1 in the active mode in accordance with the engine rotational speed NE and accelerator opening ACC (step 17). Details on this determination will also be described later.

On the other hand, if the answer to step 11 is NO, indicating that the second intake valve IV2 is in the active mode, it is determined whether or not the engine rotational speed NE is lower than a pause start rotational speed NVTECSTOP (for example, 2900 rpm) which is lower than the operation start rotational speed NVTECSTART (step 18). If the answer to step 18 is NO, it is again determined whether or not the accelerator opening ACC is smaller than a pause start opening ACCSTOP (for example, 80% opening) which is smaller than the operation start opening ACCSTART (step 19). If the answer to step 19 is NO, i.e., NE≧NVTECSTOP and ACC≧ACCSTOP, the aforementioned steps 16 and 17 are executed to maintain the second intake valve IV2 in the active mode, and opening/closing timings for the first intake valve IV1 are determined in the active mode.

On the other hand, if the answer to step 18 or 19 is YES, i.e., if NE<NVTECSTOP or ACC<ACCSTOP is established, the foregoing steps 14 and 15 are executed to start the pause mode, switch the intake cam 11 to the minute lift cam 11a, and determine opening/closing timings for the first intake valve IV1 in the pause mode.

Figure 6:
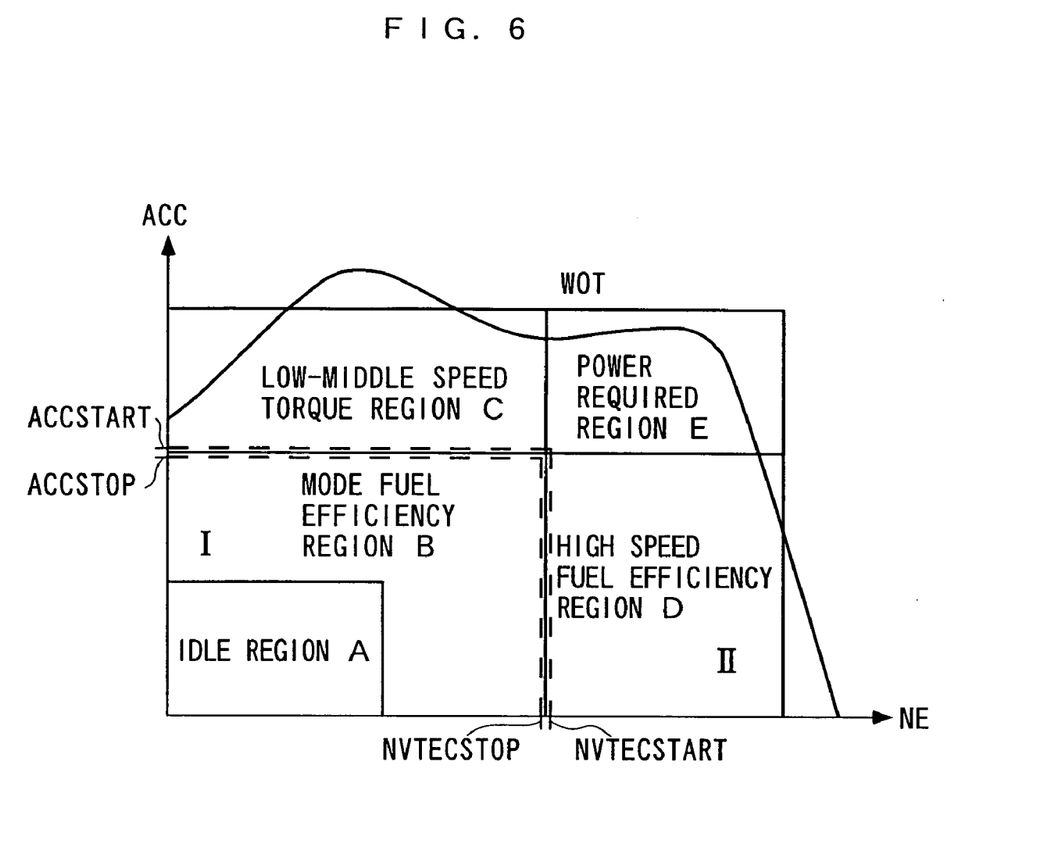
FIG. 6 is a graph showing an exemplary operation region map.

In the foregoing manner, the operation mode of the second intake valve IV2 is determined in accordance with the engine rotational speed NE and accelerator opening ACC. Specifically, as shown in FIG. 6, the second intake valve IV2 is set to the pause mode in a pause mode region I associated with a low rotational speed/low load state, in which the NE value and ACC value are both small. Thus, in the low rotational speed/low load state, the intake cam 11 is set to the minute lift cam 11a so that the second intake valve IV2 is opened/closed by a minute lift amount, thereby generating a swirl in the cylinder 4 as illustrated in FIG. 4 to ensure a stable combustion state even with a lean air/fuel mixture. On the other hand, the operation mode of the second intake valve IV2 is set to the active mode in an active mode region II associated with a high rotational speed/high load state, in which the NE value and ACC value are both large. Thus, in a high rotational speed/high load state, the intake cam 11 is set to the low-speed cam 11b so that the second intake valve IV2 is opened/closed by a larger lift amount, thereby increasing the amount of intake air to ensure larger power.

It should be noted that the operation start rotational speed NVTECSTART and pause start rotational speed NVTECSTOP as well as the operation start opening ACCSTART and pause start opening ACCSTOP, which are determination values for switching the operation mode of the second intake valve IV2, are set to different values from one another as mentioned above because hysteresis is provided to prevent the second intake valve IV2 from hunting in a switching operation.

Next, processing involved in the determination of opening/closing timings for the first intake valve IV1 executed at steps 15 and 17 in FIG. 5 will be described in detail with reference to FIGS. 6 and 7. As described above, the opening/closing timings for the first intake valve IV1 are determined in accordance with the engine rotational speed NE and accelerator opening ACC. Specifically, an operation region map shown in FIG. 6 has been previously set, so that it is determined in which of these operation regions the engine 3 exists in accordance with the NE value and ACC value, and the opening/closing timing for the first intake valve IV1 are determined based on an operation mode corresponding to a determined operation region. A region above a curve in FIG. 6 shows a wide open throttle (WOT) region.

As shown in FIG. 6, operation regions in the pause mode region I of the second intake valve IV2 correspond to an idle region A and a mode fuel efficiency region B. In these operation regions, the second intake valve IV2 is set to the pause mode, and the opening/closing timing for the first intake valve IV1 are determined for each operation region in the following manner.

Idle Region A

In the idle region A, the first intake valve IV1 is set to a non-overlap (O/L)/late close mode to provide an optimal fuel efficiency. Specifically, the valve opening timing for the first intake valve IV1 is determined such that the first intake valve IV1 does not overlap the first and second exhaust valves EV1, EV2 to limit the internal EGR amount. Also, the closing timing is set to late closing, i.e., +60° to 130° from the bottom dead center (BDC) (see FIG. 7A). This is because the combustion fluctuates more due to exacerbation of the ignition performance due to adiabatic expansion in an intake stroke in the low rotational speed/low load state, so that the first intake valve IV1 is slowly closed to minimize a pumping loss. With the foregoing settings, the fuel efficiency is maximized in the idling region A.

Mode Fuel Efficiency Region B

In the mode fuel efficiency region B, the first intake valve IV1 is set to an overlap/late close mode to reconcile the optimal fuel efficiency and exhaust gas characteristic. Specifically, the valve opening timing is determined such that the first intake valve IV1 overlaps the exhaust valves EV1, EV2 as required (see FIG. 7A). In this manner, a scavenging effect provided by intake ripples and exhaust ripples is utilized as appropriate to improve the filling efficiency, thereby making it possible to increase the torque. On the other hand, the valve closing timing is set to late closing from BDC+60° to 130° in a manner similar to the idle region A to reduce the fuel efficiency.

Also, as shown in FIG. 6, operation regions in the pause mode region II of the second intake valve IV2 correspond to a low-middle speed torque region C, a high speed fuel efficiency region D, and a power required region E. In these operation regions, the second intake valve IV2 is set to the active mode, and the opening/closing timings for the first intake valve IV1 are set for each operation region in the following manner.

Low-Middle Speed Torque Region C

In the low-middle speed torque region C, the first intake valve IV1 is set to an overlap/BDC close mode to provide an optimal torque. Specifically, as is the case with the mode fuel efficiency region B, the valve opening timing is determined such that the first intake valve IV1 overlaps the exhaust valves EV1, EV2 as required to increase the torque resulting from the scavenging effect. On the other hand, the valve closing timing is set to BDC closing (see FIG. 7B) which is near BDC, thereby increasing an actual stroke volume to increase the torque.

High Speed Fuel Efficiency Region D

In the high speed fuel efficiency region D, the first intake valve IV1 is set to the non-overlap/late close mode to provide an optimal fuel efficiency, as is the case with the idle region A, to maximally improve the fuel efficiency. In this event, since the second intake valve IV2 is set to the active mode, required power is ensured.

Power Required Region E

In the power required region, the first intake valve IVl is set to the overlap/BDC close mode to provide an optimal torque, as is the case with the low-middle speed torque region C. In this event, the valve opening timing is set to allow maximum utilization of the scavenging effect by the overlapping, thereby increasing a torque in a high accuracy.

Figure 7A:
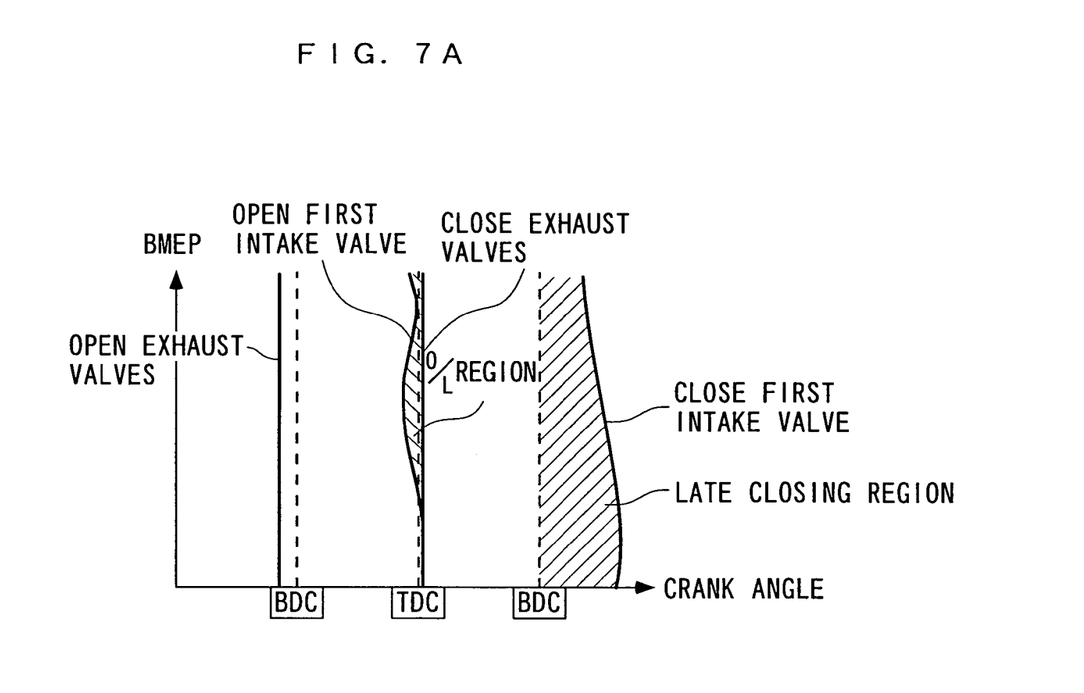
FIGS. 7A and 7B are graphs showing exemplary settings of opening/closing timings for the first intake valve in a low rotation state and in a WOT region, respectively.
Figure 7B:
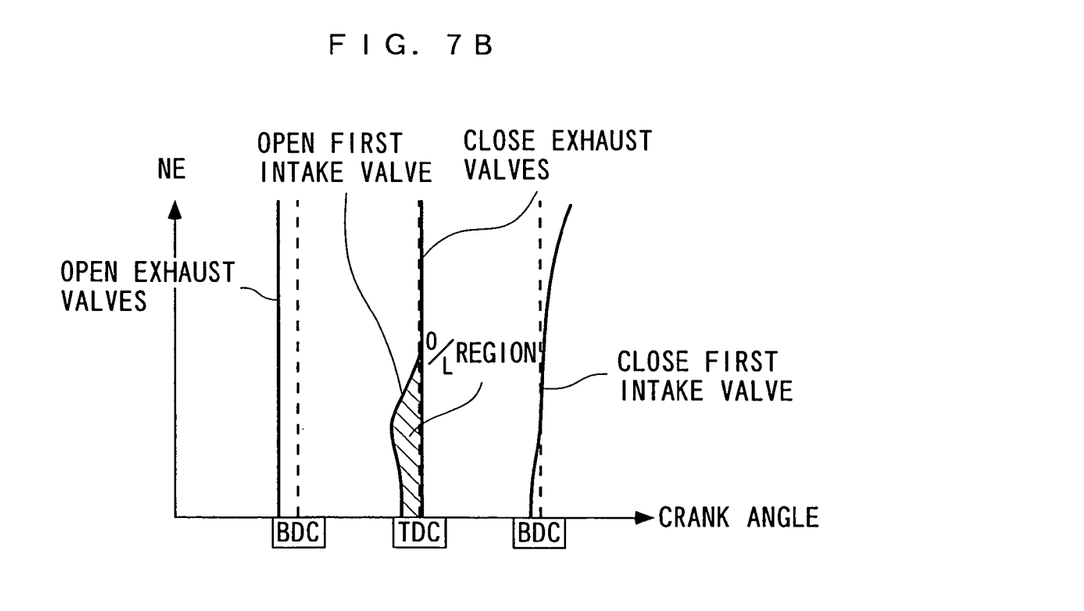

FIGS. 7A, 7B show exemplary settings of the opening/closing timings for the first intake valve IV1 in a low rotational speed state (for example, 1500 rpm) and in a WOT region, respectively. As shown in FIG. 7A, in a low rotational speed state, the second intake valve IV2 is set to the pause mode, and the valve opening timing for the first intake valve IV1 is set such that the first intake valve IV1 does not overlap the exhaust valves EV1, EV2 to improve the fuel efficiency, when the engine is lightly loaded, and set such that the first intake valve IV1 largely overlaps the exhaust valves EV1, EV2 to properly increase the torque making use of the scavenging effect when the engine is intermediately or heavily loaded.

On the other hand, the valve closing timing for the first intake valve IV1 is set to extremely late closing, for example, approximately BDC+130°. It should be noted that the valve closing timing is slightly narrowed from the super-late closing in an extremely low load state because the engine is more susceptible to combustion fluctuations begin due to an extremely low load state, so that the valve closing timing is advanced in accordance with the fluctuations. The valve closing timing in turn is set to be gradually closer to BDC as the load is increased to provide a larger torque. In the foregoing manner, the fuel efficiency can be maximally improved in a low rotational speed state by finely setting the opening/closing timings for the first intake valve IV1 based on the combustion fluctuation limit in accordance with a change in load.

In the WOT region shown in FIG. 7B, the valve opening timing for the first intake valve IV1 is set such that the first intake valve IV1 overlaps the exhaust valves EV1, EV2 at a low-middle rotational speed in order to increase the torque, making use of the scavenging effect, and is set to cause appropriate overlapping at a high rotational speed in response to an increase in the amount of intake air. On the other hand, the valve closing timing is basically set to BDC closing near BDC, in order to increase the actual stroke volume to increase the torque, and gradually set to later closing as the rotational speed becomes higher. In the foregoing manner, in the WOT region, high power can be produced by finely setting the opening/closing timing for the first intake valve IV1 in accordance with a change in the rotational speed.

Thus, according to the valve operation controller of this embodiment, the appropriate fuel efficiency and power can be provided in accordance with every and each operating state by combining as appropriate the settings of the opening/closing timings for the first intake valve IV1 and the setting of the operation mode for the second intake valve IV2 (generating and stopping a swirl). Specifically, as described above, in a low rotational speed/low load operating state, the second intake valve IV2 is set to the pause mode to generate a swirl, and the opening/closing timings for the first intake valve IV1 is set near the combustion fluctuation limit, thereby making it possible to achieve an optimal fuel efficiency. Therefore, the fuel efficiency can be largely improved as compared with the case where all intake valves are driven by a cam driven type valve operating mechanism associated with a cam shaft. In a high rotational speed/high load operating state, in turn, the second intake valve IV2 is set to the active mode to increase the amount of intake air, and the opening/closing timings for the first intake valve IV1 are set near the power limit, thereby making it possible to produce maximally large power. Therefore, the power can be largely improved as compared with the case where all intake valves are driven by a cam driven type valve operating mechanism.

Also, since the second intake valve IV2 is opened/closed by a minute lift amount in the pause mode, the fuel stagnation in the second intake valve IV2 can be eliminated to prevent an air/fuel mixture from being enriched immediately after a transition to the active mode, unlike the case where all intake valves are driven by an electromagnetic valve operating mechanism. This also results in prevention of fuel fluctuations resulting from the enriched air/fuel mixture, thereby making it possible to extend a partial non-throttle region (region in which the throttle valve is controlled to be fully opened with the accelerator pedal being partially trodden down) and to reduce the idle rotational speed. Further, since the second intake valve IV2 is opened/closed by the minute lift amount in the pause mode, carbons produced by the combustion will not stick to the second intake valve IV2 and the valve seat thereof, even if the pause mode lasts a long time, thereby making it possible to eliminate the problem that the second intake valve IV2 is stuck to the valve seat.

Also, in the valve operation controller according to this embodiment, the first intake valve IV1 alone is driven by the electromagnetic valve operating mechanism 5, while the second intake valve IV2 as well as the first and second exhaust valves EV1, EV2 are driven by the cam type valve operating mechanism 6 and cam type exhaust valve operating mechanism 7, thereby making it possible to save the power consumption to improve the fuel efficiency and reduce the cost and weight, as compared with the case where all intake and exhaust valves are driven by an electromagnetic valve operating mechanism.

Moreover, since the exhaust valves EV1, EV2 are driven by the cam type exhaust valve operating mechanism 7, the exhaust valves EV1, EV2 will be free from the step-out phenomenon inherent to an electromagnetic valve operating mechanism, thus eliminating a possible degradation of the exhaust gas characteristic due to the emission of unburnt gas through a stepped-out exhaust valve.

According to the valve operation controller of the foregoing embodiment, the following control can also be performed in addition to the control so far described. For example, the first intake valve IV1 is maintained in an open state (left opened) at the start of the engine 3 to relieve the resistance on the piston and rapidly start up the engine 3, thereby making it possible to largely reduce an unburnt gas which is emitted immediately after the start. In another situation, if it is desired to instantaneously reduce the output torque of the engine 3 for purposes of traction control, alleviation of shock upon switching the automatic transmission, and the like, this can be readily accomplished by setting the second intake valve IV2 to the pause mode and closing the first intake valve IV1.

Figure 8:
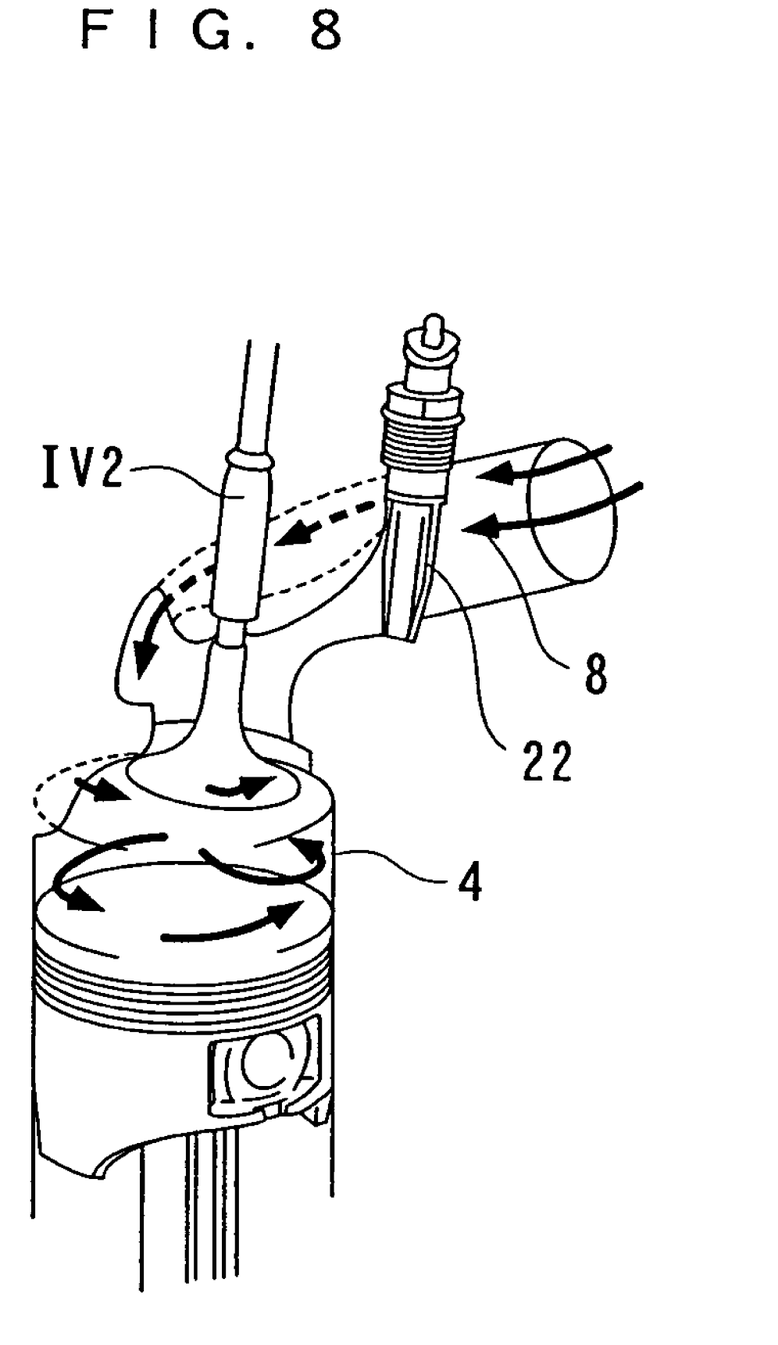
FIG. 8 is a perspective view illustrating a swirl control valve employed in a second embodiment of the present invention, and how a swirl is generated thereby.

FIG. 8 illustrates a second embodiment of the present invention. In the second embodiment, the VTEC 13 in the first embodiment is removed, and the intake port 8 is provided with a swirl control valve 22. Though not shown, the intake cam is comprised of a normal intake cam having one stage of cam profile. The swirl control valve 22 is connected to a swirl control actuator (not shown), and is driven to open/close the intake port 8 by controlling the pressure in its operation chamber by a driving signal from the ECU 2. When the swirl control valve 22 is in operation, the intake port 8 is partially closed to generate a swirl as indicated by an arrow in FIG. 8. When the swirl control valve 22 is inoperative, the intake port 8 is opened to increase the amount of intake air, thereby providing high power. The remaining configuration of the second embodiment is similar to the first embodiment, so that the first intake valve IV1 as well as the first and second exhaust valves EV1, EV2 are omitted in FIG. 8 for convenience of illustration.

Thus, in the second embodiment, effects similar to those of the first embodiment can be produced by controlling the swirl control valve 22 to open/close in accordance with the operating state of the engine 3. Also, since the second intake valve IV2 itself is normally opened/closed by a cam type valve operating mechanism, the fuel stagnation and sticking to the valve seat are eliminated in the second intake valve IV2, as is the case with the first embodiment.

It should be understood that the present invention is not limited to the embodiments described above, but may be practiced in a variety of implementations. For example, while the foregoing embodiments employ the accelerator opening ACC as a parameter indicative of a load on the engine 3, it goes without saying that the intake pipe absolute pressure PBA, throttle valve opening θTH, cylinder pressure, intake air amount, or the like may be used as such a parameter instead of the accelerator opening ACC. Also, in the first embodiment, a swirl is generated in the horizontal direction as a cylinder flowage by setting the second intake valve IV2 to the pause mode. Alternatively, a cylinder flowage in the vertical direction (tumble flow) may be generated by changing the layout of the intake port or the like.

INDUSTRIAL AVAILABILITY

As described above, the valve operation controller for an internal combustion engine according to the present invention can optimally set a valve opening timing and a valve closing timing can for an intake valve in accordance with an operating state of the internal combustion engine. Therefore, the present invention can advantageously improve the fuel efficiency and power of the internal combustion engine, eliminate the fuel stagnation in the intake valve and sticking of the intake valve with its valve seat, and reduce the cost and weight of the controller.

The invention claimed is:

1. A valve operation controller for an internal combustion engine for controlling open/close operations of an exhaust valve and a first and a second intake valve arranged in one cylinder, said valve operation controller comprising:
    an electromagnetic valve operating mechanism for electromagnetically opening/closing said first intake valve;
    a cam type valve operating mechanism for opening/closing said second intake valve with an intake cam arranged on a cam shaft driven in synchronism with rotation of said internal combustion engine, said cam type valve operating mechanism capable of generating a cylinder flowage within a combustion chamber of said cylinder;
    operating state detecting means for detecting an operating state of said internal combustion engine;
    operation mode determining means for determining an operation mode for each of said electromagnetic valve operating mechanism and said cam type valve operating mechanism in accordance with the detected operating state of said internal combustion engine; and
    control means for controlling operations of said electromagnetic valve operating mechanism and said cam type valve operating mechanism in accordance with the determined operation mode,
    wherein said cam type valve operating mechanism comprises a cam profile switching mechanism for switching a cam profile of said intake cam between a minute lift cam for opening/closing said second intake valve by a minute lift amount to generate the cylinder flowage, and a normal lift cam for opening/closing said second intake valve by a lift amount larger than said minute lift amount.

2. A valve operation controller for an internal combustion engine according to claim 1, wherein said cam type valve operating mechanism comprises a swirl control valve at a location upstream of said second intake valve.

3. A valve operation controller for an internal combustion engine according to claim 1, further comprising:
    a cam type exhaust valve operating mechanism for opening/closing said exhaust valve with an exhaust cam arranged on the cam shaft driven in synchronism with rotation of said internal combustion engine.

4. A valve operation controller for an internal combustion engine according to claim 1, wherein:
    said cylinder includes at least two cylinders adjacent to each other, said at least two cylinders having said first intake pipes arranged adjacent to each other; and
    said electromagnetic valve operating mechanism for driving each of said first intake valve is provided as a single module.

5. A valve operation controller for an internal combustion engine for controlling open/close operations of an exhaust valve and a first and a second intake valve arranged in one cylinder, said valve operation controller comprising:
    an electromagnetic valve operating mechanism for electromagnetically opening/closing said first intake valve;
    a cam type valve operating mechanism for opening/closing said second intake valve with an intake cam arranged on a cam shaft driven in synchronism with rotation of said internal combustion engine, said cam type valve operating mechanism capable of generating a cylinder flowage within a combustion chamber of said cylinder;
    operating state detecting means for detecting an operating state of said internal combustion engine;
    operation mode determining means for determining an operation mode for each of said electromagnetic valve operating mechanism and said cam type valve operating mechanism in accordance with the detected operating state of said internal combustion engine;
    control means for controlling operations of said electromagnetic valve operating mechanism and said cam type valve operating mechanism in accordance with the determined operation mode;
    rotation detecting means for detecting a rotational speed of said internal combustion engine; and
    load detecting means for detecting a load on said internal combustion engine,
    wherein said control means controls said cam type valve operating mechanism to generate a cylinder flowage within said combustion chamber, and controls said electromagnetic valve operating mechanism such that said first intake valve is opened or closed at a timing near a combustion fluctuation limit, when said internal combustion engine is in a predetermined low-rotational speed, low-load condition, based the results of detections made by said rotation detecting means and said load detecting means.

6. A valve operation controller for an internal combustion engine for controlling open/close operations of an exhaust valve and a first and a second intake valve arranged in one cylinder, said valve operation controller comprising:
    an electromagnetic valve operating mechanism for electromagnetically opening/closing said first intake valve;
    a cam type valve operating mechanism for opening/closing said second intake valve with an intake cam arranged on a cam shaft driven in synchronism with rotation of said internal combustion engine, said cam type valve operating mechanism capable of generating a cylinder flowage within a combustion chamber of said cylinder;
    operating state detecting means for detecting an operating state of said internal combustion engine;
    operation mode determining means for determining an operation mode for each of said electromagnetic valve operating mechanism and said cam type valve operating mechanism in accordance with the detected operating state of said internal combustion engine;
    control means for controlling operations of said electromagnetic valve operating mechanism and said cam type valve operating mechanism in accordance with the determined operation mode;
    rotation detecting means for detecting a rotational speed of said internal combustion engine; and
    load detecting means for detecting a load on said internal combustion engine,
    wherein said control means controls said cam type valve operating mechanism to generate a cylinder flowage within said combustion chamber, and controls said electromagnetic valve operating mechanism such that said first intake valve is opened or closed at a timing near a combustion fluctuation limit, when said internal combustion engine is in a predetermined high-rotational speed, high-load condition, based the results of detections made by said rotation detecting means and said load detecting means.

7. A valve operation controller for an internal combustion engine according to claim 1, wherein said control means controls said electromagnetic valve operating mechanism to maintain said first intake valve in an opened state when said internal combustion engine is started.

8. A valve operation controller for an internal combustion engine according to claim 1, wherein said control means controls said cam profile switching mechanism to switch the cam profile of said intake cam to said minute lift cam, and controls said electromagnetic valve operating mechanism to maintain said first intake valve in an opened state, when an output torque of said internal combustion engine should be suddenly decreased.

9. A valve operation controller for an internal combustion engine according to claim 1, further comprising:
   a cam type exhaust valve operating mechanism for opening/closing said exhaust valve with an exhaust cam arranged on the cam shaft driven in synchronism with rotation of said internal combustion engine.

10. A valve operation controller for an internal combustion engine according to claim 2, further comprising:
    a cam type exhaust valve operating mechanism for opening/closing said exhaust valve with an exhaust cam arranged on the cam shaft driven in synchronism with rotation of said internal combustion engine.

11. A valve operation controller for an internal combustion engine for controlling open/close operations of an exhaust valve and a first and a second intake valve arranged in one cylinder, said valve operation controller comprising:
    an electromagnetic valve operating mechanism for electromagnetically opening/closing said first intake valve;
    a cam type valve operating mechanism for opening/closing said second intake valve with an intake cam arranged on a cam shaft driven in synchronism with rotation of said internal combustion engine, said cam type valve operating mechanism capable of generating a cylinder flowage within a combustion chamber of said cylinder;
    operating state detecting means for detecting an operating state of said internal combustion engine;
    operation mode determining means for determining an operation mode for each of said electromagnetic valve operating mechanism and said cam type valve operating mechanism in accordance with the detected operating state of said internal combustion engine; and
    control means for controlling operations of said electromagnetic valve operating mechanism and said cam type valve operating mechanism in accordance with the determined operation mode,
    wherein said cylinder includes at least two cylinders adjacent to each other, said at least two cylinders having said first intake valves arranged adjacent to each other and said second intake valves arranged on both sides of said first intake valves, and
    said electromagnetic valve operating mechanism for driving each of said first intake valves is provided as a single module and arranged between said second intake valves.

12. A valve operation controller for an internal combustion engine for controlling open/close operations of an exhaust valve and a first and a second intake valve arranged in one cylinder, said valve operation controller comprising:
    an electromagnetic valve operating mechanism for electromagnetically opening/closing said first intake valve;
    a cam type valve operating mechanism for opening/closing said second intake valve with an intake cam arranged on a cam shaft driven in synchronism with rotation of said internal combustion engine, said cam type valve operating mechanism capable of generating a cylinder flowage within a combustion chamber of said cylinder;
    operating state detecting means for detecting an operating state of said internal combustion engine;
    operation mode determining means for determining an operation mode for each of said electromagnetic valve operating mechanism and said cam type valve operating mechanism in accordance with the detected operating state of said internal combustion engine; and
    control means for controlling operations of said electromagnetic valve operating mechanism and said cam type valve operating mechanism in accordance with the determined operation mode,
    wherein said electromagnetic valve operating mechanism is arranged such that said electromagnetic valve operating mechanism does not overlap said cam shaft in an axial direction of said cam shaft.

* * * * *